US012468055B2

(12) United States Patent
Koker et al.

(10) Patent No.: US 12,468,055 B2
(45) Date of Patent: Nov. 11, 2025

(54) ENERGY BIN EVENT COUNTING SYSTEM (71) Applicant: Analog Devices, Inc., Wilmington, MA (US)

(72) Inventors: Gregory T. Koker, Wilmington, MA (US); Matthew A. Woodruff, Wilmington, MA (US)

(73) Assignee: Analog Devices, Inc., Wilmington, MA (US)

( * ) Notice: Subject to any disclaimer, the term of this patent is extended or adjusted under 35 U.S.C. 154(b) by 339 days.

(21) Appl. No.: 18/023,608

(22) PCT Filed: Jul. 8, 2021

(86) PCT No.: PCT/US2021/040787
§ 371 (c)(1),
(2) Date: Feb. 27, 2023

(87) PCT Pub. No.: WO2022/046294
PCT Pub. Date: Mar. 3, 2022

(65) Prior Publication Data
US 2023/0314639 A1 Oct. 5, 2023

Related U.S. Application Data (60) Provisional application No. 63/070,925, filed on Aug. 27, 2020.

(51) Int. Cl.
G01T 1/29 (2006.01)
G01T 1/17 (2006.01)
G01T 1/36 (2006.01)

(52) U.S. Cl.
CPC ............ *G01T 1/2985* (2013.01); *G01T 1/171* (2013.01); *G01T 1/2971* (2013.01); *G01T 1/366* (2013.01)

(58) Field of Classification Search
CPC ..... G01T 1/2985; G01T 1/171; G01T 1/2971; G01T 1/366
See application file for complete search history.

(56) References Cited

U.S. PATENT DOCUMENTS 7,109,475 B1    9/2006  Hardman et al.
7,157,681 B1 *  1/2007  Tetzlaff ................. H01J 43/04
                                                      250/214 VT
(Continued)

FOREIGN PATENT DOCUMENTS

CN        101529274 A       9/2009
KR    10-2015-0125131 A    11/2015
(Continued)

OTHER PUBLICATIONS

International Search Report and Written Opinion for International Patent Application No. PCT/US2021/040787, mailed Oct. 6, 2021 (9 pages).

*Primary Examiner* — David J Makiya
*Assistant Examiner* — Gisselle M Gutierrez
(74) *Attorney, Agent, or Firm* — ArentFox Schiff LLP (57) ABSTRACT One embodiment is a method for binning charge events in a photon-counting CT scanning system comprising a plurality of discriminators, wherein each discriminator is associated with a respective one of a plurality of threshold voltage levels, the method comprising detecting a transition in a signal output from one of the discriminators; and incrementing a count corresponding to the threshold voltage level associated with the one of the discriminators only if the detected discriminator output signal transition was immediately preceded by an opposite transition in the discriminator output signal.

20 Claims, 8 Drawing Sheets (56) References Cited

U.S. PATENT DOCUMENTS

| | | |
|---|---|---|
| 2014/0334600 A1 | 11/2014 | Lee et al. |
| 2017/0205284 A1 | 7/2017 | De Geronimo |
| 2023/0228888 A1* | 7/2023 | Riehl ........................ G01T 1/17 |
| | | 378/5 |
| 2024/0188918 A1* | 6/2024 | Poddar .................... G01T 1/171 |

FOREIGN PATENT DOCUMENTS

| | | |
|---|---|---|
| WO | 2013093726 A1 | 6/2013 |
| WO | 2017/085304 A1 | 5/2017 |
| WO | 2019/137901 A1 | 7/2019 |

* cited by examiner

ENERGY BIN EVENT COUNTING SYSTEM

RELATED APPLICATION

This application is a 35 U.S.C. § 371 National Phase of International Patent Application No. PCT/US2021/040787, filed Jul. 8, 2021, which claims priority to U.S. Provisional Patent Application No. 63/070,925, entitled "ENERGY BIN EVENT COUNTING SYSTEM" and filed Aug. 27, 2020, the contents of which applications are hereby incorporated herein by reference in their entireties.

FIELD OF THE DISCLOSURE

This disclosure relates generally to the field of energy level event counters and, more particularly, to an energy bin event counting system that enables improved performance during pile-up scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. When used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1:
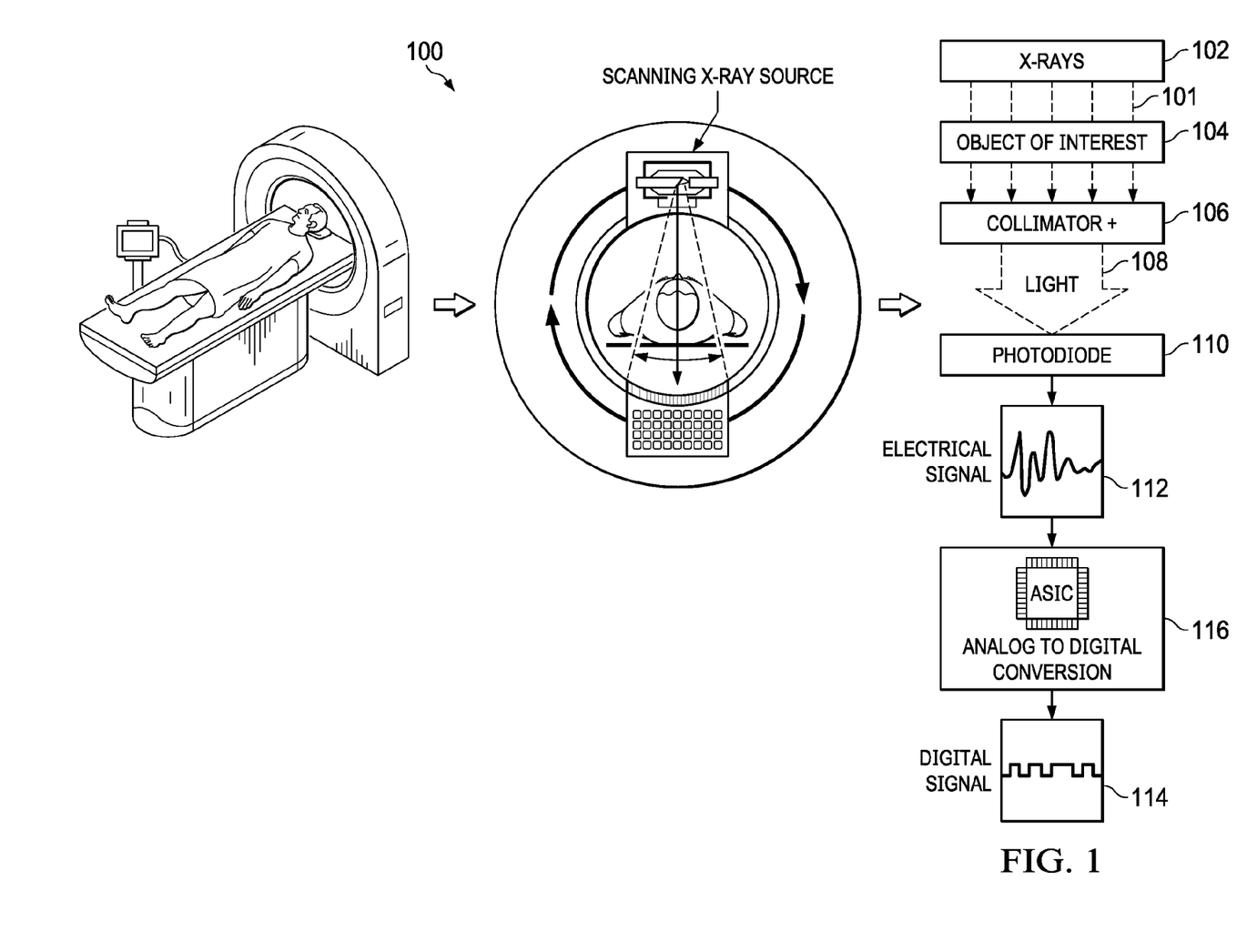
FIG. 1 is a schematic diagram illustration of operation of a conventional CT scanning system in accordance with features of certain embodiments described herein.

Referring to FIG. 1, in a traditional computed tomography (CT) scanning system 100 employs X-rays 101 generated by an X-ray source 102 and passed through an object of interest 104. The X-rays are transformed by a collimator and scintillator 106 into light 108 that is captured by a detector implemented as a photodiode arrays 110. The photodiode arrays 110 transform the light 108 into analog electrical signals 112, which are converted into digital signals 114 using an analog-to-digital (A/D) converter 116. The digital signal output from the A/D converter is used to produce a gray scale image referred to as a CT scan.

Photon-counting CT imaging is relatively new technique that may offer significant advantages and improvements over existing CT imaging techniques described above. A photon-counting CT system employs a photon-counting detector (PCD) comprising a semiconductor layer for implementing an array of detector pixels that register the interactions of individual photons with the PCD. By tracking the deposited energy of each interaction, detector pixels of a PCD record an approximate energy spectrum as well as intensity of the photons, such that photon-counting CT is a spectral, or energy-resolved, CT technique. In contrast, traditional CT scanners use energy-integrating detectors (EIDs) in which the total energy from one or more photons as well as electronic noise deposited in a pixel during a fixed period of time is registered. EIDs therefore register only photon intensity, analogous to black-and-white photography. In contrast, PCDs register both photon intensity and spectral information, analogous to color photography.

Photon-counting CT imaging turns the three-step process described above into a more streamlined direct conversion from X-ray to charge via semiconductor layer comprising the PCD. In particular, the semiconductor material used to implement the PCD efficiently turns each X-ray photon into a burst of charge that is proportional to the energy of the X-ray. Benefits of this technology include improved signal-to-noise, reduced X-ray dose to the patient due to the higher resolution that may be achieved with the same X-ray dose, improved spatial resolution and, through use of several "energy bins," the ability to distinguish multiple contrast agents and multiple types of materials/tissues.

When a photon interacts in a PCD, the height of a resulting electrical pulse is approximately proportional to the energy of the photon. By comparing each pulse produced in a pixel with a suitable low-energy threshold, contributions from low-energy events (resulting from both photon interactions and electronic noise) can be filtered out. As a result, PCDs have higher signal-to-noise and contrast-to-noise ratios as compared to EIDs, enabling an increase in image quality at the same X-ray exposure level or a decrease in patient X-ray dose with the same image quality.

Introduction of more energy thresholds above the low-energy threshold enables a PCD to be divided into several discrete energy bins. Each registered photon is assigned to a specific bin depending on its energy, such that each pixel measures a histogram of the incident X-ray spectrum. This spectral information enables a qualitative determination of the material composition of each pixel in the reconstructed CT image, as opposed to the estimated average linear attenuation coefficient obtained in a conventional CT scan. Additionally, using more than two energy bins enables discrimination between dense bones and calcifications versus heavier elements commonly used as contrast agents, reducing the need for a reference scan before contrast injection and thereby further reducing the amount of X-ray dose to which a patient is subjected.

Figure 2:
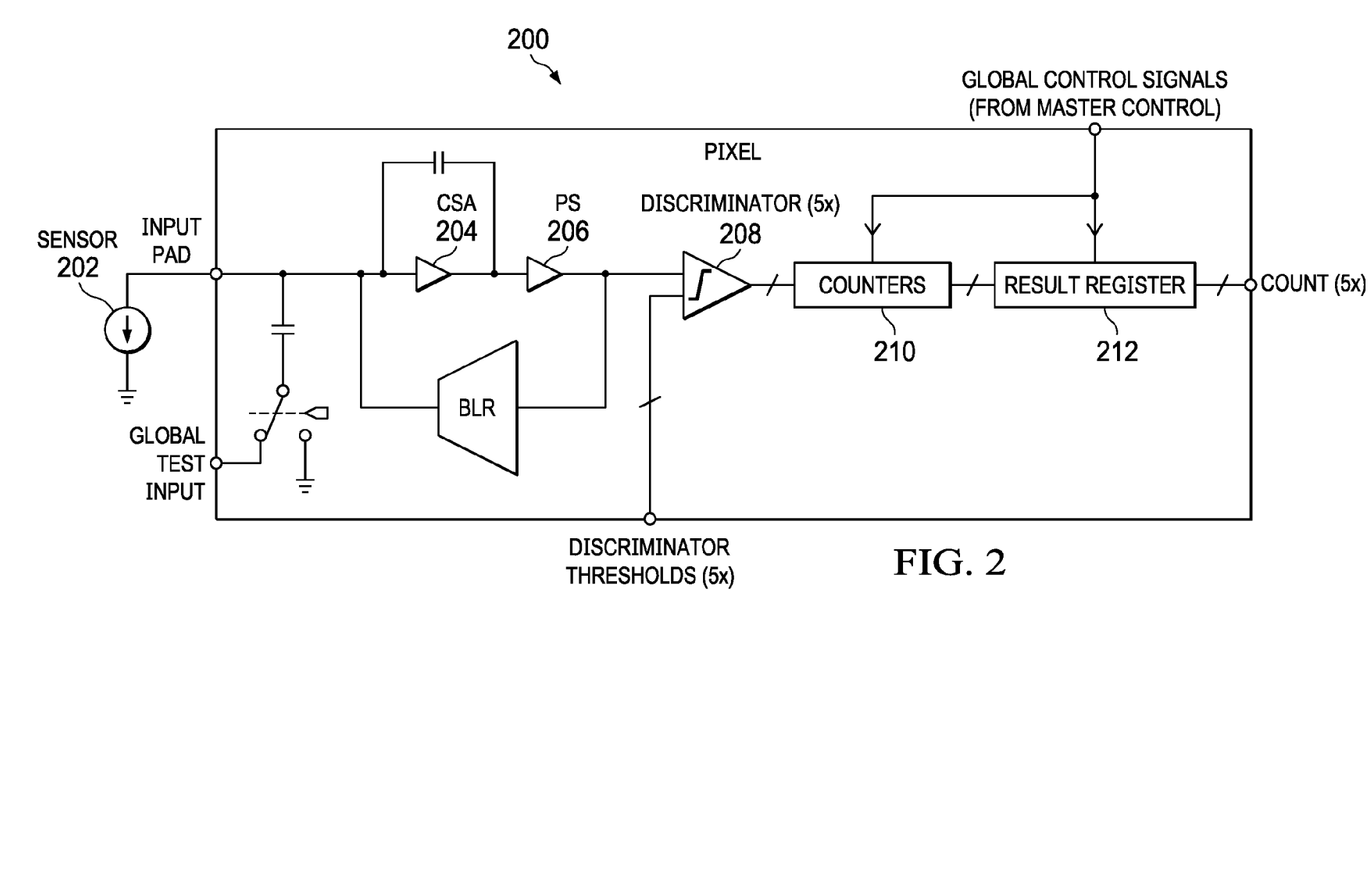
FIG. 2 is a schematic block diagram of a photon-counting CT scanning system in accordance with features of certain embodiments described herein.

FIG. 2 illustrates a schematic diagram of an example signal processing architecture for a photon-counting CT system 200 comprising a PCD including a plurality of detector pixels, represented in FIG. 2 by a single pixel. In operation, a pulse of current comes in from a sensor 202, is amplified by a charge-sensitive amplifier (CSA) 204 and shaped by a pulse shaper (PS) 206. The voltage pulse output from the PS 206 is input to a set of N discriminators (or comparators) 208, which respectively compare the pulse to N increasing voltage thresholds. The set of discriminators 208 create pulsed digital outputs in a "thermometer code." The pulses may be counted at each level, or threshold, by counters 210, with the resulting count values (which may be temporarily stored in result registers 212) representing how many X-ray hits at each of the N thresholds have occurred. It will be recognized that the thresholds are set to match the different voltages corresponding to the different energy photons.

Figure 3:
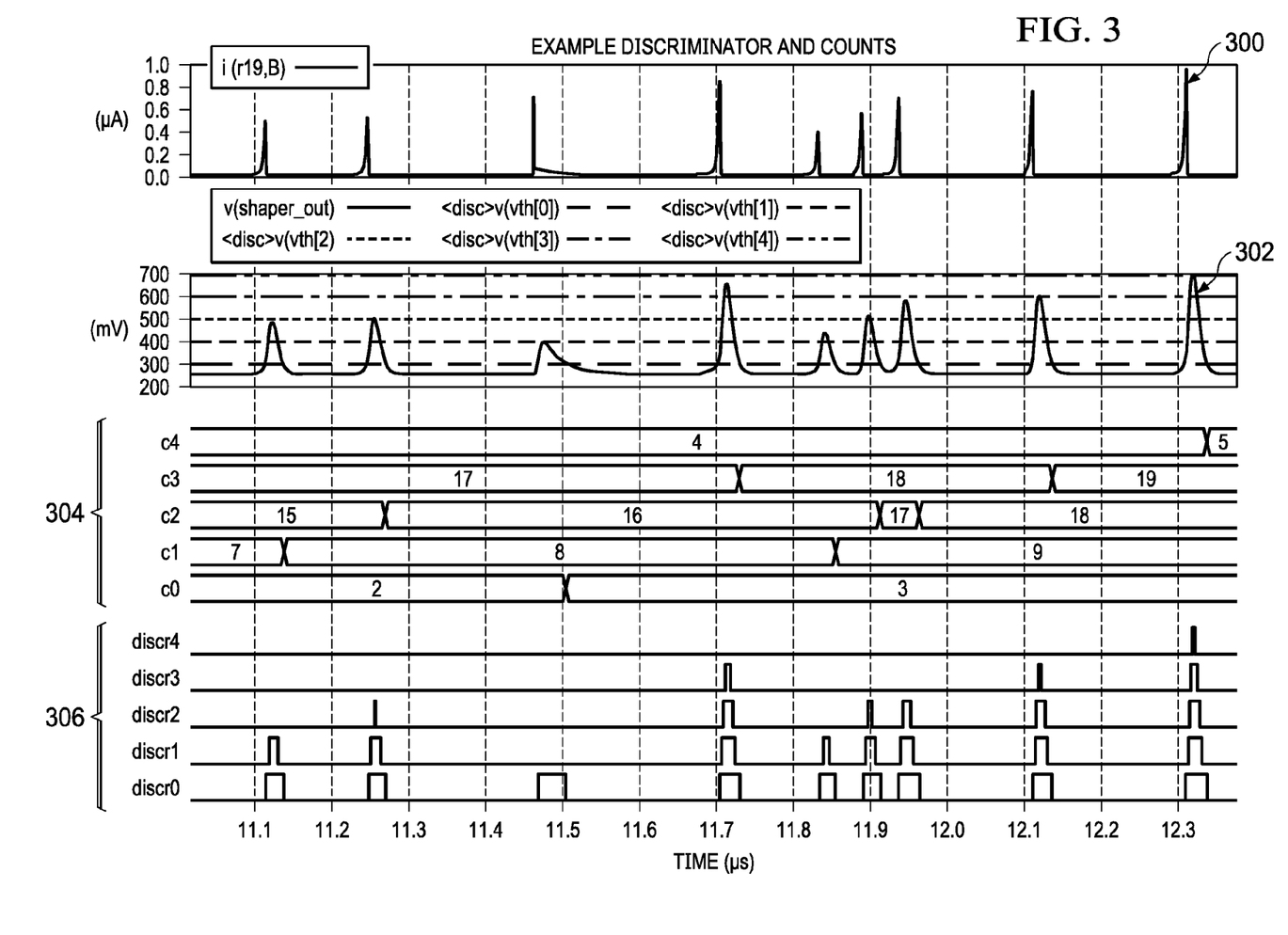
FIG. 3 is a graph illustrating results of a simulation example of the photon-counting CT scanning system of FIG. 2 in accordance with features of certain embodiments described herein.

FIG. 3 is a graph illustrating results of a simulation example of a photon-counting CT system illustrated in FIG. 2 using three different counting techniques in which there are no overlapping charge events. A first waveform 300 represents current pulses from the sensor 202 and a second waveform 302 represents corresponding voltage pulses output from the PS 206 vs. increasing voltage thresholds expressed in millivolts (mV). Waveforms 304 represent the corresponding pulses counted at each level by counters 210. Finally, waveforms 306 represent outputs of discriminators 208 input to counters 210. It will be noted from FIG. 3 that, for each pulse of current, a voltage pulse from the pulse shaper generates outputs on the discriminators 208. Counting by the counters 210 of the peak discriminator output for each pulse is the desired response.

When all of the pulses occur far enough apart in time, there are multiple ways to effectively implement counters to count and "bin" the pulses. Two common techniques of doing so include asynchronous edge (asynch_edge) counting and peak zero (peak_zero) counting. Using asynchronous edge counting, an asynchronous counter is associated with each discriminator output. As a result, the counter increments for any energy level above the threshold level of the associated discriminator. If a "binned" value is required, for each counter, the counts of the higher threshold level counters must be subtracted from the count to determine the correct count for threshold level. For example, the counter associated with discriminator 0 is also incremented for every discriminator 1-N count; therefore, to get an accurate level 0 count, counts for discriminators 1-N must be subtracted from the count for discriminator 0. Similarly, the counter associated with discriminator 1 is also incremented for every discriminator 2-N count; therefore, to get an accurate level 1 count, counts for discriminators 2-N must be subtracted from the count for discriminator 1.

Using peak zero counting, the edges of the signals output from discriminator 0 are used to decide which counter to increment. The method is basically to increment only the maximum discriminators count that occurs between the rise and fall of discriminator 0.

Both asynchronous edge counting and peak zero counting work reasonably well when the events being counted are spaced apart without any overlap. If there are no other charge events, there will always be an orderly sequence starting and ending with discriminator 0 rising and falling. There will also be a rising edge of all levels below the maximum switching discriminator.

Figure 4:
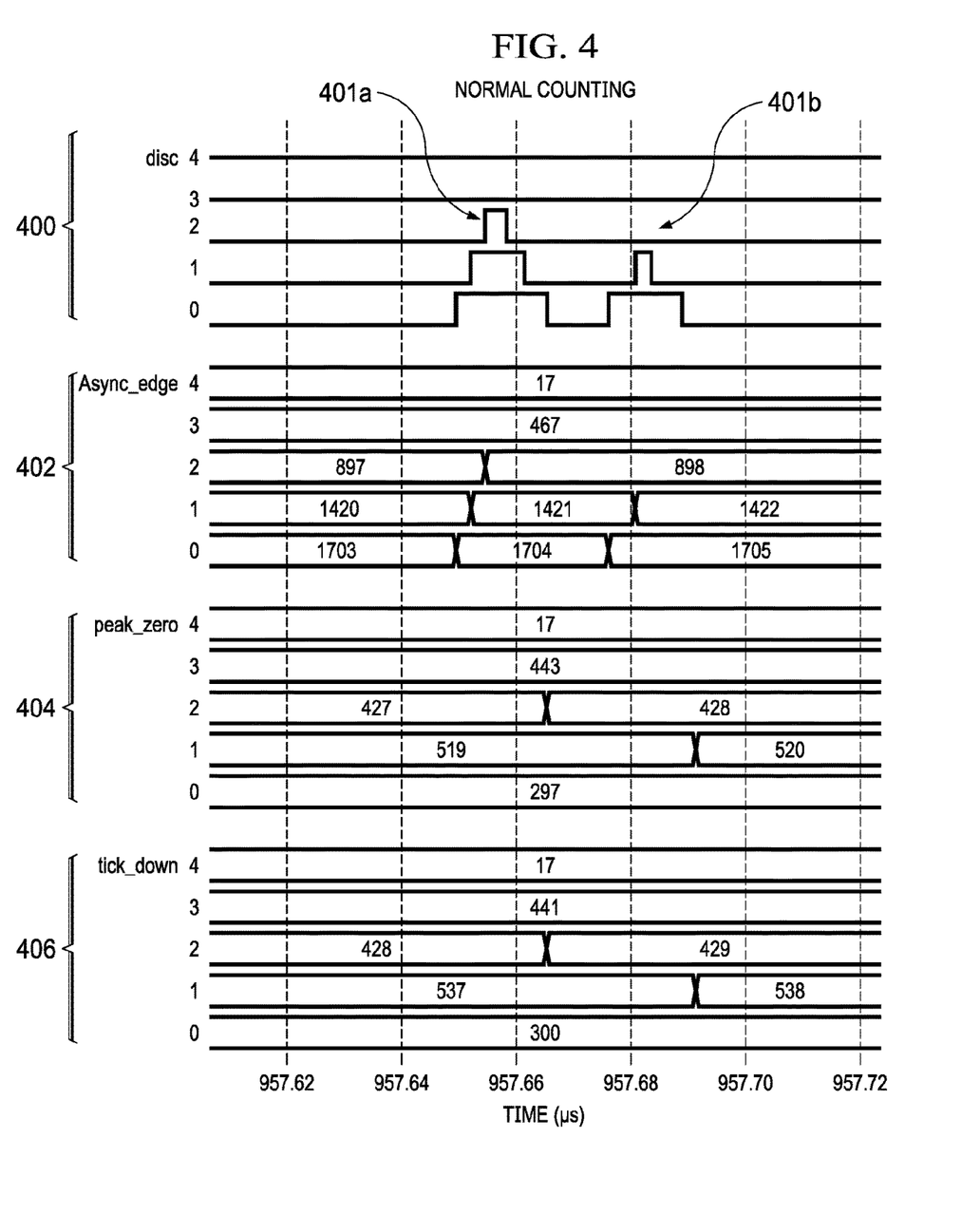
FIG. 4 is a graph illustrating results of a simulation example of the photon-counting CT scanning system of FIG. 2 in which there are no overlapping charge events using three different counting techniques in accordance with features of certain embodiments described herein.

FIG. 4 illustrates operation of asynchronous edge and peak zero counting in a case such as that described above in which the charge events are spaced apart with no overlap. Referring to FIG. 4, a set of waveforms 400 correspond to outputs of discriminators 0-4. As visible from waveform 400, there are two charge events 401a, 401b. A set of waveforms 402 illustrate cumulative count values for threshold levels 0-4 in response to the charge events 401a, 401b, using asynchronous edge counting to implement the counters. In contrast, as set of waveforms 404 illustrate cumulative count values for threshold levels 0-4 in response to the charge events 401a, 401b, when peak zero counting is used to implement the counters.

As will be described in greater detail hereinbelow, a set of waveforms 406 illustrate cumulative count values for threshold levels 0-4 in response to the charge events 401a, 401b, using a more accurate counting technique in accordance with features of embodiments described herein and referred to as "tick down counting."

In the scenario illustrated in FIG. 4, which will be referred to herein as a "non-pile-up case," the asynchronous edge counters increment for each transition (requiring subtraction of count totals of higher threshold level counters from count totals of lower threshold level counters, as previously described) and the peak zero counters simply increment for the maximum level reached between levels. The tick down counters also increment only on the peak level reached; however, as will be described with reference to FIG. 5, the tick down counters operate very differently, and more accurately, in situations in which there is a pile-up.

Pile-up occurs when the charge events occur close enough together to disrupt the orderly transition up and down the discriminators. Pile-ups occur at higher rates as the X-ray flux increases and their rate can be predicted statistically. A pile-up situation is illustrated in FIG. 5.

Figure 5:
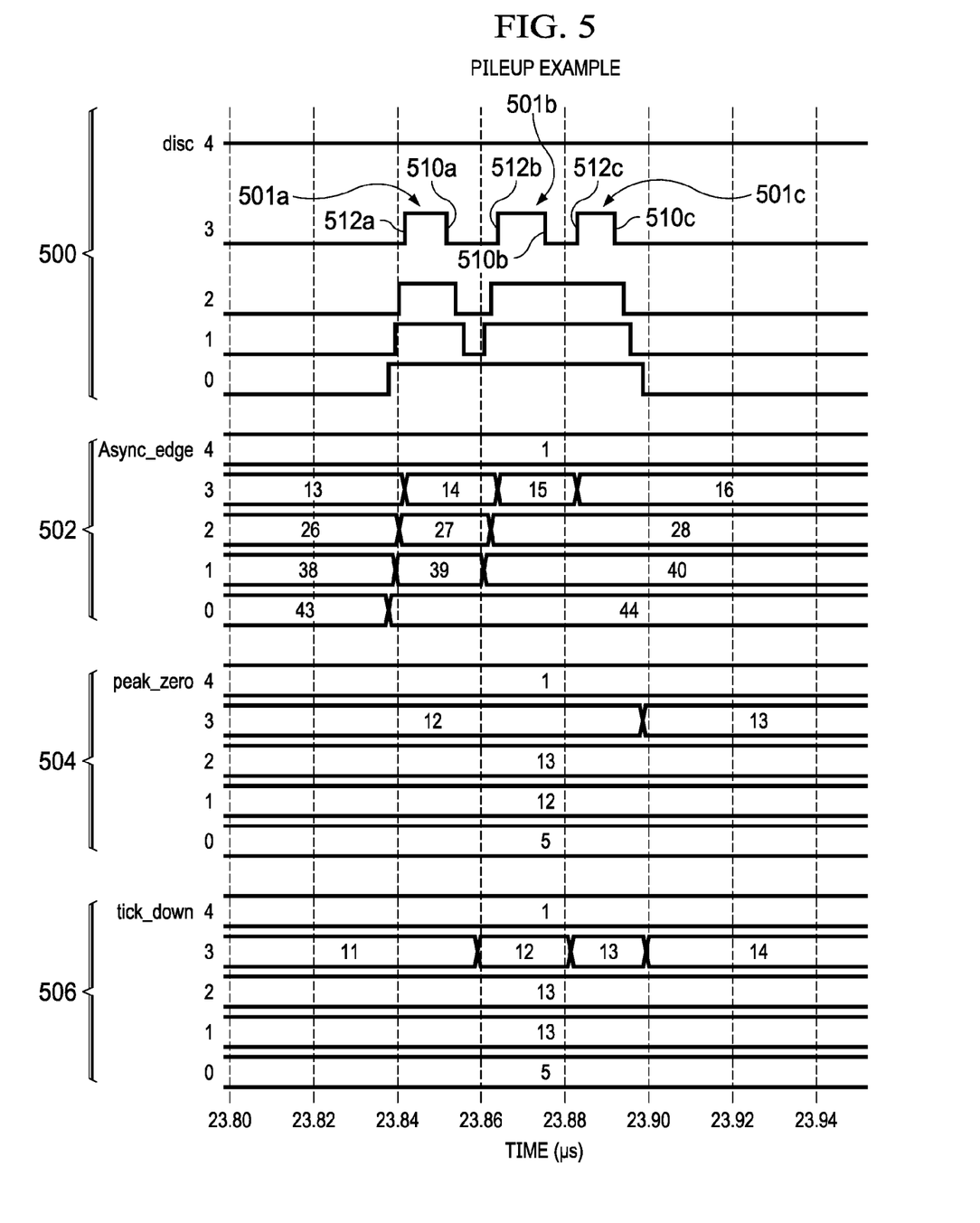
FIG. 5 is a graph illustrating results of a simulation example of the photon-counting CT scanning system of FIG. 2 in which there are overlapping charge events using three different counting techniques; in accordance with features of certain embodiments described herein.

Referring to FIG. 5, a set of waveforms 500 correspond to outputs of discriminators 0-4. As visible from waveform 500, there are three charge events 501a-501c. Unlike the charge events 401a, 401b, shown in FIG. 4, the events 501a-501c are overlapping, creating a pile-up situation. A set of waveforms 502 illustrate cumulative count values for threshold levels 0-4 in response to the charge events 501a-501c, using asynchronous edge counting to implement the counters. In contrast, as set of waveforms 504 illustrate cumulative count values for threshold levels 0-4 in response to the charge events 501a-501c, when peak zero counting is used to implement the counters.

As illustrated in FIG. 5, the asynchronous edge counting technique fails to increment discriminator 0 for two of the three charge events, as would occur if the events were spread out as in FIG. 4. As also illustrated in FIG. 5, the peak zero counting technique fails to increment discriminator 3 for two of the three charge events 501a-501c, as would occur if the events were spread out as in FIG. 4, because it becomes paralyzed by failure of the energy level to fall back to the threshold level for discriminator 0. For reasons that will be described in detail below, as illustrated by a set of waveforms 506, the tick down counting technique accurately counts all three charge events 501a-501c as discriminator 3 counts.

The tick down counting technique operates by identifying the peaks of discriminator outputs by only counting "down-tick" events that are immediately preceded by an "up-tick" event. Referring again to FIG. 5, each down-tick 510a-510c of discriminator 3 is immediately preceded by a respective up-tick 512a-512c; therefore, the count for threshold level 3 is incremented three times (from 11 to 14). The various other down-ticks of the other discriminators are immediately preceded by down-ticks, rather than up-ticks, and are therefore not counted in the corresponding counter value.

It will be recognized that, while embodiments herein are described using a tick down counting technique, circuitry could be designed such to implement a tick up counting technique, in which only those up-ticks that are immediately followed by down-ticks are counted by the corresponding threshold level counter without departing from the spirit or scope of embodiments described herein.

Figure 6:
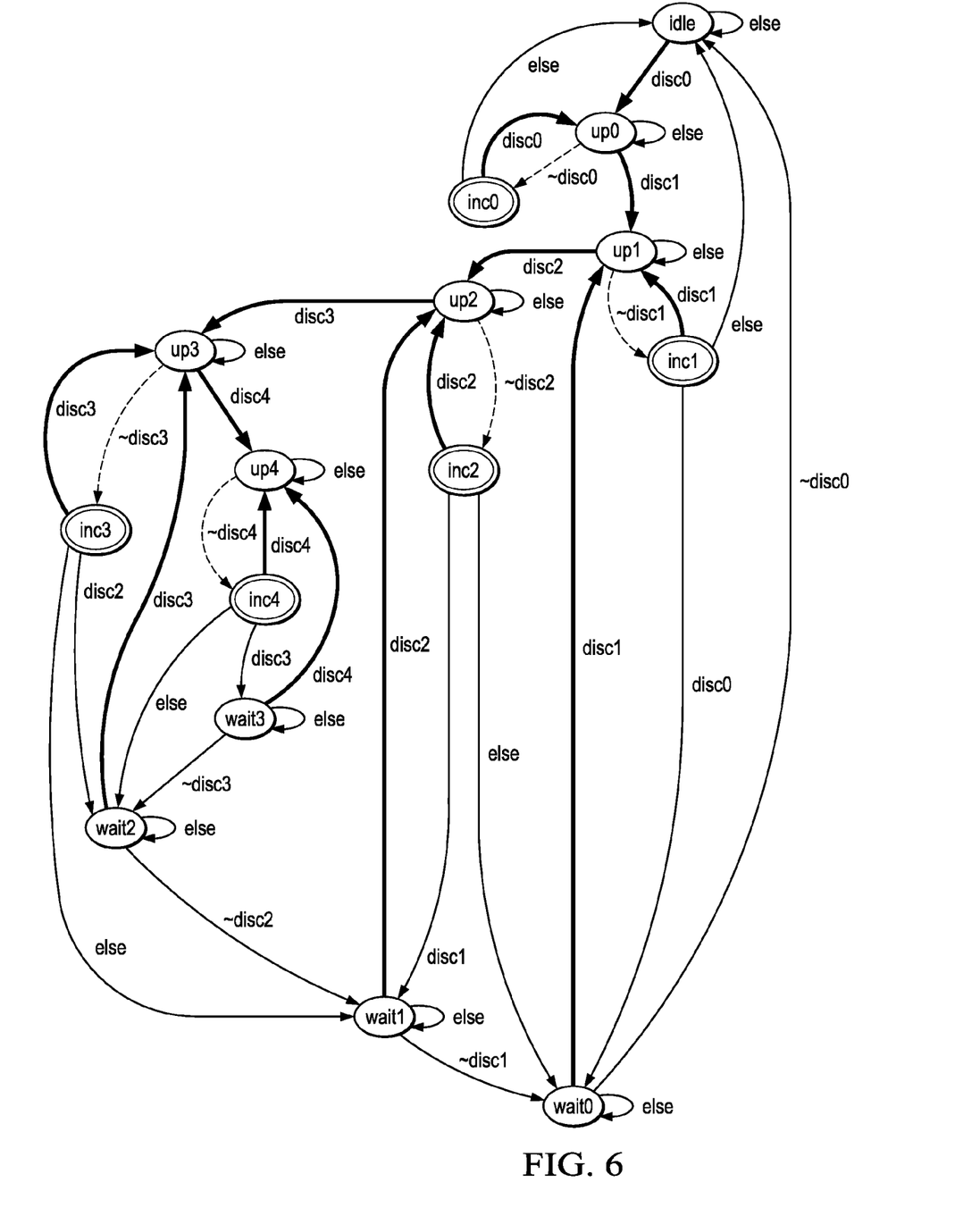
FIG. 6 is a state machine of counting circuitry for use in the photon-counting CT scanning system of FIG. 2 in accordance with features of certain embodiments described herein.

FIG. 6 illustrates a state machine for implementing the down-tick counter described herein. It will be noted that the state machine may be implemented as a synchronous or asynchronous state machine. As shown in FIG. 6, the system begins in an idle state and remains there until there is an up-tick in discriminator 0 (disc0), in response to which the system enters an up0 state. The system remains in the up0 state until there is an up-tick in discriminator 1 (disc1), in response to which the system enters an up1 state, or until there is a down-tick in discriminator 0 (−disc0), in response to which the system enters a state inc0 in which the count for threshold level 0 is incremented. From state inc0, the system returns to the up0 state if the next event is an up-tick in discriminator 0; otherwise, the system returns to the idle state.

From the up1 state, the system will remain in that state until there is an up-tick in discriminator 2 (disc2), in response to which the system enters an up2 state, or until there is a down-tick in discriminator 1 (−disc1), in response to which the system enters a state inc1 in which the count for threshold level 1 is incremented. From the inc1 state, the system returns to the up1 state if the next event is an up-tick in discriminator 1 and proceeds to a wait0 state if the next event is a down-tick in discriminator 0; otherwise, the system returns to the idle state. From the wait0 state, the system remains in the state until there is an up-tick in discriminator 1 (disc1), in response to which the system returns to the up1 state, or a down-tick in discriminator 0, in response to which the system returns to the idle state.

From the up2 state, the system will remain in that state until there is an up-tick in discriminator 3 (disc3), in response to which the system enters an up3 state, or until there is a down-tick in discriminator 2 (−disc2), in response to which the system enters a state inc2 in which the count for threshold level 2 is incremented. From the inc2 state, the system returns to the up2 state if the next event is an up-tick in discriminator 2 and proceeds to a wait1 state if the next event is a down-tick in discriminator 1; otherwise, the system proceeds to the wait0 state. From the wait1 state, the system remains in the state until there is an up-tick in discriminator 2 (disc2), in response to which the system returns to the up2 state, or a down-tick in discriminator 1, in response to which the system returns to the wait0 state.

From the up3 state, the system will remain in that state until there is an up-tick in discriminator 4 (disc4), in response to which the system enters an up4 state, or until there is a down-tick in discriminator 3 (−disc3), in response to which the system enters a state inc3 in which the count for threshold level 3 is incremented. From the inc3 state, the system returns to the up3 state if the next event is an up-tick in discriminator 3 and proceeds to a wait2 state if the next event is a down-tick in discriminator 2; otherwise, the system proceeds to the wait1 state. From the wait2 state, the system remains in the state until there is an up-tick in discriminator 3 (disc3), in response to which the system returns to the up3 state, or a down-tick in discriminator 2, in response to which the system returns to the wait1 state.

From the up4 state, the system will remain in that state until there is a down-tick in discriminator 4 (−disc4), in response to which the system enters a state inc4 in which the count for threshold level 4 is incremented. From the inc4 state, the system returns to the up4 state if the next event is an up-tick in discriminator 4 and proceeds to a wait3 state if the next event is a down-tick in discriminator 3; otherwise, the system proceeds to the wait2 state. From the wait3 state, the system remains in the state until there is an up-tick in discriminator 4 (disc4), in response to which the system returns to the up4 state, or a down-tick in discriminator 3, in response to which the system returns to the wait2 state.

Figure 7:
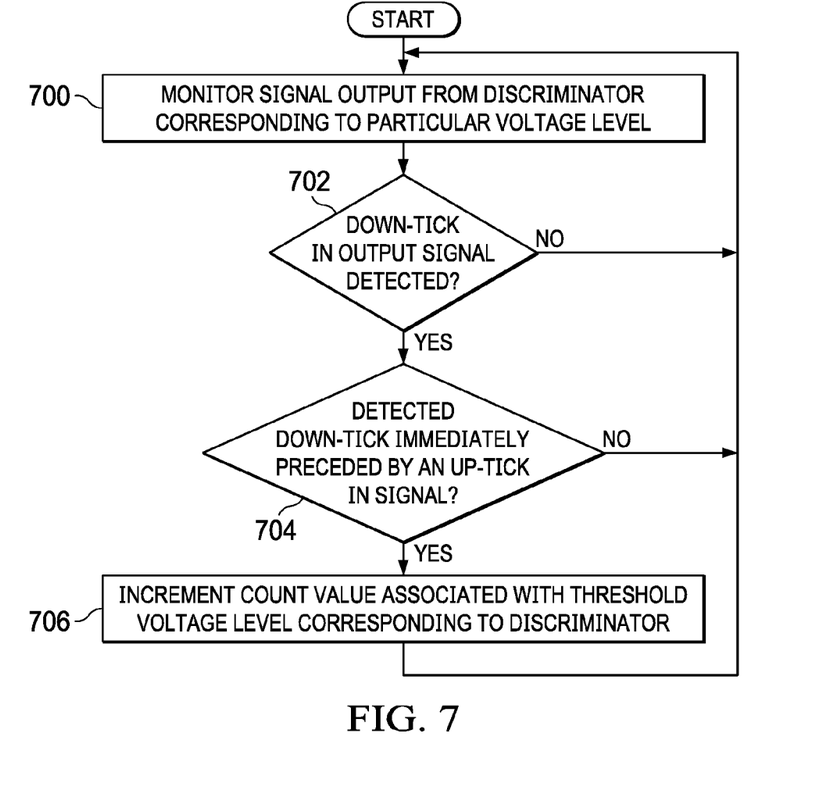
FIG. 7 is a flow chart illustrating example operation of a photon-counting CT scanning system in accordance with features of certain embodiments described herein.

FIG. 7 is a flow chart illustrating example operation of a photon-counting CT scanning system in accordance with features of certain embodiments described herein. It will be noted that the steps shown in FIG. 7 may be implemented in connection with each discriminator/counter combination corresponding to a particular threshold voltage level as described above. Referring to FIG. 7, in step 700, the signal output from the discriminator (which discriminator corresponds to a particular threshold voltage level) is monitored. In step 702, a determination is made whether a down-tick in the discriminator output signal is detected. If a negative determination is made in step 702, execution returns to step 700. Conversely, if a positive determination is made in step 702, execution proceeds to step 704.

In step 704, a determination is made whether the down-tick detected in step 702 was immediately preceded in the output signal by an up-tick. If a negative determination is made in step 704, execution returns to step 700. Conversely, if a positive determination is made in step 704, execution proceeds to step 706. In step 706, the count value (e.g., a counter register) associated with the threshold voltage level of the discriminator is incremented by one.

Figure 8:
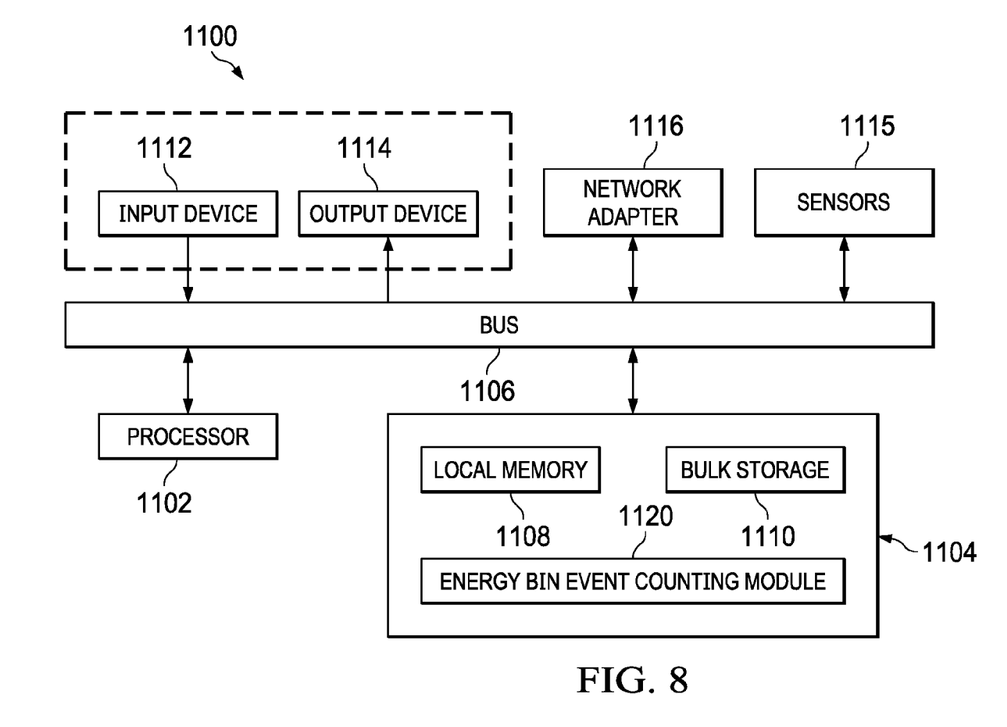
FIG. 8 is a block diagram of a computer system that may be used to implement all or some portion of a photon-counting CT scanning system in accordance with features of certain embodiments described herein.

FIG. 8 is a block diagram illustrating an example system 1100 that may be configured to implement at least portions of techniques in accordance with embodiments described herein, and more particularly as shown in the FIGURES described hereinabove. As shown in FIG. 8, the system 1100 may include at least one processor 1102, e.g. a hardware processor 1102, coupled to memory elements 1104 through a system bus 1106. As such, the system may store program code and/or data within memory elements 1104. Further, the processor 1102 may execute the program code accessed from the memory elements 1104 via a system bus 1106. In one aspect, the system may be implemented as a computer that is suitable for storing and/or executing program code. It should be appreciated, however, that the system 1100 may be implemented in the form of any system including a processor and a memory that is capable of performing the functions described in this disclosure.

In some embodiments, the processor 1102 can execute software or an algorithm to perform the activities as discussed in this specification; in particular, activities related to embodiments described herein. The processor 1102 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 1102 may be communicatively coupled to the memory element 1104, for example in a direct-memory access (DMA) configuration, so that the processor 1102 may read from or write to the memory elements 1104.

In general, the memory elements 1104 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 1100 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing embodiments as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 1104 shown in FIG. 8 can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 1102 shown in FIG. 8, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1104 may include one or more physical memory devices such as, for example, local memory 1108 and one or more bulk storage devices 1110. The local memory may refer to RAM or other non-persistent memory device(s) generally used during actual execution of the program code. A bulk storage device may be implemented as a hard drive or other persistent data storage device. The processing system 1100 may also include one or more cache memories (not shown) that provide temporary storage of at least some program code in order to reduce the number of times program code must be retrieved from the bulk storage device 1110 during execution.

As shown in FIG. 8, the memory elements 1104 may store an energy bin event counting module 1120. In various embodiments, the module 1120 may be stored in the local memory 1108, the one or more bulk storage devices 1110, or apart from the local memory and the bulk storage devices. It should be appreciated that the system 1100 may further execute an operating system (not shown in FIG. 8) that can facilitate execution of the module 1120. The module 1120, being implemented in the form of executable program code and/or data, can be read from, written to, and/or executed by the system 1100, e.g., by the processor 1102. Responsive to reading from, writing to, and/or executing the module 1120, the system 1100 may be configured to perform one or more operations or method steps described herein.

Input/output (I/O) devices depicted as an input device 1112 and an output device 1114, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 1114. Input and/or output devices 1112, 1114 may be coupled to the system 1100 either directly or through intervening I/O controllers. Additionally, sensors 1115, may be coupled to the system 1100 either directly or through intervening controllers and/or drivers.

In an embodiment, the input and the output devices may be implemented as a combined input/output device (illustrated in FIG. 8 with a dashed line surrounding the input device 1112 and the output device 1114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1116 may also, optionally, be coupled to the system 1100 to enable it to become coupled to other systems, computer systems, remote network devices, and/or remote storage devices through intervening private or public networks. The network adapter may comprise a data receiver for receiving data that is transmitted by said systems, devices and/or networks to the system 1100, and a data transmitter for transmitting data from the system 1100 to said systems, devices and/or networks. Modems, cable modems, and Ethernet cards are examples of different types of network adapter that may be used with the system 1100.

Example 1 is a method for binning charge events in a photon-counting CT scanning system comprising a plurality of discriminators, wherein each discriminator is associated with a respective one of a plurality of threshold voltage levels, the method including detecting a transition in a signal output from one of the discriminators; and incrementing a count corresponding to the threshold voltage level associated with the one of the discriminators only if the detected discriminator output signal transition was immediately preceded by an opposite transition in the discriminator output signal.

In Example 2, the method of Example 1 may further include refraining from incrementing the count corresponding to the threshold voltage level associated with the one of the discriminators if the detected discriminator output signal transition was immediately preceded by other than an opposite transition in the discriminator output signal.

In Example 3, the method of any of Examples 1-2 may further include the transition in the discriminator output signal comprises a down-tick consisting of a high-to-low transition.

In Example 4, the method of any of Examples 1-3 may further include the opposite transition in the discriminator output signal comprising an up-tick consisting of a low-to-high transition.

In Example 5, the method of any of Examples 1-4 may further include the plurality of discriminators comprising five discriminators.

In Example 6, the method of any of Examples 1-5 may further include the plurality of threshold voltage levels comprising five threshold voltage levels.

In Example 7, the method of any of Examples 1-6 may further include each of the discriminators comparing a voltage signal input to the discriminators to the threshold voltage level associated with the discriminator.

In Example 8, the method of any of Examples 1-7 may further include an output of each of the discriminators being driven high when the voltage signal input to the discriminators exceeds the threshold voltage level associated with the discriminator.

In Example 9, the method of any of Examples 1-8 may further include the discriminator output signals comprising a thermometer code.

Example 10 is a method for binning charge events in a photon-counting CT scanning system comprising a plurality of discriminators, wherein each discriminator is associated with one of a plurality of threshold voltage levels and a counter for counting charge events that fall within a threshold voltage range associated with the discriminator, the method including, for each of the discriminators detecting a transition in a signal output from the discriminator; incrementing the counter only if the detected transition was immediately preceded by an opposite transition in the discriminator output signal; and refraining from incrementing the counter if the detected discriminator output signal transition was immediately preceded by an opposite transition in the discriminator output signal.

In Example 11, the method of Example 10 may further include the transition in the output signal comprising a down-tick consisting of a high-to-low transition.

In Example 12, the method of any of Examples 10-11 may further include the opposite transition in the discriminator output signal comprising an up-tick consisting of a low-to-high transition.

In Example 13, the method of any of Examples 10-12 may further include the plurality of discriminators comprising five discriminators.

In Example 14, the method of any of Examples 10-13 may further include the plurality of threshold voltage levels comprising five threshold voltage levels.

In Example 15, the method of any of Examples 10-14 may further include each of the discriminators comparing a voltage signal input to the discriminators to the threshold voltage level associated with the discriminator.

In Example 16, the method of any of Examples 10-15 may further include an output of each of the discriminators being driven high when the voltage signal input to the discriminators exceeds the threshold voltage level associated with the discriminator.

In Example 17, the method of any of Examples 10-16 may further include the discriminator output signals comprising a thermometer code.

Example 18 is a photon-counting CT scanning system including a plurality of discriminators, wherein each discriminator is associated with a respective one of a plurality of threshold voltage levels; and counting circuitry configured to receive an output signal from each of the discriminators; detect a transition in a first one of output signals received from a first one of the discriminators; and increment a count associated with the threshold voltage level associated with the first one of the discriminators only if the detected transition was immediately preceded by an opposite transition in the first one of the output signals.

In Example 19, the system of Example 18 may further include the counting circuitry being further configured to refrain from incrementing the count associated with the threshold voltage level associated with the first one of the discriminators if the detected transition in the first one of the output signals was not immediately preceded by an opposite transition in the first one of the output signals.

In Example 20, the system of any of Examples 18-19 may further include the transition in the discriminator output signal comprising a down-tick consisting of a high-to-low transition.

In Example 21, the system of any of Examples 18-20 may further include the opposite transition in the discriminator output signal comprising an up-tick consisting of a low-to-high transition.

In Example 22, the system of any of Examples 18-21 may further include the plurality of discriminators comprising five discriminators.

In Example 23, the system of any of Examples 18-22 may further include the plurality of threshold voltage levels comprise five threshold voltage levels.

In Example 24, the system of any of Examples 18-23 may further include each of the discriminators comparing a voltage signal input to the discriminators to the threshold voltage level associated with the discriminator.

In Example 25, the system of any of Examples 18-24 may further include an output of each of the discriminators being driven high when the voltage signal input to the discriminators exceeds the threshold voltage level associated with the discriminator.

In Example 26, the system of any of Examples 18-25 may further include the discriminator output signals comprising a thermometer code.

Example 27 is a photon-counting CT scanning system including a sensor for detecting a light and outputting a pulse corresponding to the detected light; a plurality of discriminators for receiving the pulse output from the sensor, wherein each discriminator is associated with a respective one of a plurality of threshold voltage levels; and counting circuitry configured to receive an output signal from each of the discriminators; detecting a transition in a first one of output signals received from a first one of the discriminators; and increment a count associated with the threshold voltage level associated with the first one of the discriminators only if the detected transition was immediately preceded by an opposite transition in the first one of the output signals.

In Example 28, the system of Example 27 may further include the counting circuitry being further configured to refrain from incrementing the count associated with the threshold voltage level associated with the first one of the discriminators if the detected transition in the first one of the output signals was not immediately preceded by an opposite transition in the first one of the output signals.

In Example 29, the system of any of Examples 27-28 may further include the transition in the discriminator output signal comprising a down-tick consisting of a high-to-low transition.

In Example 30, the system of any of Examples 27-29 may further include the opposite transition in the discriminator output signal comprising an up-tick consisting of a low-to-high transition.

In Example 31, the system of any of Examples 27-30 may further include the plurality of discriminators comprising five discriminators.

In Example 32, the system of any of Examples 27-31 may further include the discriminator output signals comprising a thermometer code.

In Example 33, the system of any of Examples 27-32 may further include a charge sensitive amplifier (CSA) for amplifying the pulse output from the sensor before the pulse is received by the discriminators.

In Example 34, the system of any of Examples 27-33 may further include a pulse shaper for shaping the pulse output from the sensor before the pulse is received by the discriminators.

In Example 35, the system of any of Examples 27-34 may further include a charge sensitive amplifier (CSA) for amplifying the pulse output from the sensor before the pulse is received by the discriminators; and a pulse shaper for shaping the pulse output from the CSA before the pulse is received by the discriminators.

It should be noted that all of the specifications, dimensions, and relationships outlined herein (e.g., the number of elements, operations, steps, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, exemplary embodiments have been described with reference to particular component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system may be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and may accommodate a large number of components, as well as more complicated/sophisticated arrangements and configurations. Accordingly, the examples provided should not limit the scope or inhibit the broad teachings of the electrical circuits as potentially applied to myriad other architectures.

It should also be noted that in this Specification, references to various features (e.g., elements, structures, modules, components, steps, operations, characteristics, etc.) included in "one embodiment", "exemplary embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It should also be noted that the functions related to circuit architectures illustrate only some of the possible circuit architecture functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Note that all optional features of the device and system described above may also be implemented with respect to the method or process described herein and specifics in the examples may be used anywhere in one or more embodiments.

The 'means for' in these instances (above) may include (but is not limited to) using any suitable component discussed herein, along with any suitable software, circuitry, hub, computer code, logic, algorithms, hardware, controller, interface, link, bus, communication pathway, etc.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and may accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for binning charge events, comprising:
detecting a transition in a signal output from a first discriminator of a plurality of discriminators in a photon-counting computed-tomography (CT) scanning system, wherein each discriminator of the plurality of discriminators is associated with a respective one of a plurality of threshold voltage levels; and
incrementing a count corresponding to the threshold voltage level associated with the first discriminator only if the detected transition in the signal output from the first discriminator was immediately preceded by an opposite transition in the signal output by the first discriminator.

2. The method of claim 1 further comprising refraining from incrementing the count corresponding to the threshold voltage level associated with the first discriminator if the detected transition in the signal output from the first discriminator was not immediately preceded by the opposite transition in the signal output by the first discriminator.

3. The method of claim 1, wherein the transition in the signal output from the first discriminator comprises a down-tick including a high-to-low transition.

4. The method of claim 1, wherein the opposite transition in the signal output from the first discriminator comprises an up-tick including a low-to-high transition.

5. The method of claim 1, wherein the plurality of discriminators comprises five discriminators.

6. The method of claim 1, wherein the plurality of threshold voltage levels comprises five threshold voltage levels.

7. The method of claim 1, wherein each discriminator of the plurality of discriminators compares a voltage signal input to the plurality of discriminators to the threshold voltage level associated with the discriminator.

8. The method of claim 7, wherein an output of each discriminator of the plurality of discriminators is driven high when the voltage signal input to the plurality of discriminators exceeds the threshold voltage level associated with the discriminator.

9. The method of claim 1, wherein the signal output from the first discriminator comprises a thermometer code.

10. The method of claim 1, wherein each discriminator is further associated with a counter for counting charge events that fall within a threshold voltage range associated with the discriminator.

11. The method of claim 10, further comprising, for each discriminator of a plurality of discriminators,
  detecting a second transition in a second signal output from the discriminator;
  incrementing the counter only if the detected second transition was immediately preceded by a second opposite transition in the second signal output from the discriminator; and
  refraining from incrementing the counter if the detected second transition was not immediately preceded by the second opposite transition in the second signal output from the discriminator.

12. A photon-counting computed-tomography (CT) scanning system comprising:
  a plurality of discriminators, wherein each discriminator of the plurality of discriminators is associated with a respective one of a plurality of threshold voltage levels; and
  counting circuitry configured to:
    receive an output signal from each discriminator of the plurality of discriminators;
    detect a transition in a first output signal of output signals received from a first discriminator of the plurality of discriminators; and
    increment a count associated with the threshold voltage level associated with the first discriminator only if the detected transition was immediately preceded by an opposite transition in the first output signal.

13. The photon-counting CT scanning system of claim 12, wherein the counting circuitry is further configured to refrain from incrementing the count associated with the threshold voltage level associated with the first discriminator if the detected transition in the first output signal was not immediately preceded by the opposite transition in the first output signal.

14. The photon-counting CT scanning system of claim 12, wherein the transition in the first output signal comprises a down-tick consisting of a high-to-low transition.

15. The photon-counting CT scanning system of claim 12, wherein the opposite transition in the first output signal comprises an up-tick consisting of a low-to-high transition.

16. The photon-counting CT scanning system of claim 12, wherein the plurality of discriminators comprises five discriminators.

17. The photon-counting CT scanning system of claim 12, wherein the plurality of threshold voltage levels comprise five threshold voltage levels.

18. The photon-counting CT scanning system of claim 12, wherein each discriminator of the plurality of discriminators compares a voltage signal input to the plurality of discriminators to the threshold voltage level associated with the discriminator.

19. The photon-counting CT scanning system of claim 18, wherein an output of each discriminator of the plurality of the discriminators is driven high when the voltage signal input to the plurality of discriminators exceeds the threshold voltage level associated with the discriminator.

20. The photon-counting CT scanning system of claim 12, wherein the first output signal comprises a thermometer code.

* * * * *